(12) United States Patent
Ueda et al.

(10) Patent No.: US 11,551,491 B2
(45) Date of Patent: Jan. 10, 2023

(54) DRIVING EVALUATION DEVICE, DRIVING EVALUATION SYSTEM, DRIVING EVALUATION METHOD, AND NON-TRANSITORY STORAGE MEDIUM

(71) Applicant: TOYOTA JIDOSHA KABUSHIKI KAISHA, Toyota (JP)

(72) Inventors: Kenki Ueda, Tokyo-to (JP); Ryosuke Tachibana, Tokyo-to (JP); Shinichiro Kawabata, Tokyo-to (JP); Takashi Kitagawa, Kodaira (JP); Hirofumi Ohashi, Tokyo-to (JP); Toshihiro Yasuda, Osaka (JP); Tetsuo Takemoto, Toyko-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/391,106

(22) Filed: Aug. 2, 2021

(65) Prior Publication Data
US 2022/0101667 A1    Mar. 31, 2022

(30) Foreign Application Priority Data

Sep. 25, 2020    (JP) .............................. JP2020-161405

(51) Int. Cl.
*G07C 5/08*         (2006.01)
*G06F 3/04817*      (2022.01)

(52) U.S. Cl.
CPC ....... *G07C 5/0825* (2013.01); *G06F 3/04817* (2013.01); *G07C 5/085* (2013.01); *G07C 5/0808* (2013.01)

(58) Field of Classification Search
CPC .................................................. G07C 5/0825
See application file for complete search history.

(56) References Cited

U.S. PATENT DOCUMENTS

| | | | |
|---|---|---|---|
| 10,032,318 B1 * | 7/2018 | Ferguson | G07C 5/0816 |
| 2011/0153199 A1 * | 6/2011 | Morimoto | G08G 1/205 701/533 |
| 2016/0371553 A1 * | 12/2016 | Farnham, IV | G08G 1/04 |
| 2021/0188300 A1 * | 6/2021 | Kim | B60W 50/14 |
| 2021/0295621 A1 * | 9/2021 | Kang | G07C 5/0825 |

FOREIGN PATENT DOCUMENTS

JP    2007-141212 A    6/2007

* cited by examiner

*Primary Examiner* — Roland J Casillas
(74) *Attorney, Agent, or Firm* — Sughrue Mion, PLLC

(57) ABSTRACT

A driving evaluation device includes a first memory and a first processor that is coupled to the first memory. The first processor is configured to cause driving information pertaining to dangerous driving incidents collected from a vehicle to be stored in a storage unit together with types and danger ratings of the dangerous driving incidents, generate evaluation information pertaining to a driver of the vehicle based on the driving information collected from the vehicle, retrieve dangerous driving incidents pertaining to the driver based on at least one of the types or the danger ratings, and provide to a user the evaluation information that has been generated and driving information pertaining to the dangerous driving incidents that have been retrieved.

15 Claims, 14 Drawing Sheets

DRIVING EVALUATION DEVICE, DRIVING EVALUATION SYSTEM, DRIVING EVALUATION METHOD, AND NON-TRANSITORY STORAGE MEDIUM

CROSS-REFERENCE TO RELATED APPLICATION

This application is based on and claims priority under 35 USC 119 from Japanese Patent Application No. 2020-161405 filed on Sep. 25, 2020, the disclosure of which is incorporated by reference herein.

BACKGROUND

Technical Field

This disclosure relates to a driving evaluation device, a driving evaluation system, a driving evaluation method, and a non-transitory storage medium that perform driving evaluations of drivers of vehicles.

Related Art

For example, Japanese Patent Application Laid-open (JP-A) No. 2007-141212 discloses a driving assist device with which a user can easily check analysis results and which can thus contribute to safe driving by a driver. According to this driving assist device, violation data corresponding to mesh areas which are the top 50 mesh areas where violation data frequently occur, and are in the vicinity of each mesh area, are extracted as area extraction object data from a center storage unit, and the top twenty candidate areas with the highest number of violations among candidate areas are judged to be areas in which violations frequently occur, and are displayed and expanded on an analysis screen.

The driving assist device of JP-A No. 2007-141212 has the function of evaluating and ranking dangerous driving incidents per driver and the function of allowing a user to browse, by location in which the dangerous driving incidents frequently occur, information such as images.

However, when the driving assist device has extracted the evaluation of a certain driver, the user cannot browse information pertaining to the dangerous driving incidents included in the basis of the evaluation by type and danger rating of the dangerous driving incidents.

SUMMARY

This disclosure provides a driving evaluation device, a driving evaluation system, a driving evaluation method, and a driving evaluation program with which a user can browse information pertaining to dangerous driving incidents included in the basis of an evaluation of a certain driver by type and danger rating of the dangerous driving incidents.

A driving evaluation device of a first aspect includes: a collection unit that causes driving information pertaining to dangerous driving incidents collected from a vehicle to be stored in a storage unit together with types and danger ratings of the dangerous driving incidents; a generation unit that generates evaluation information pertaining to a driver of the vehicle based on the driving information collected from the vehicle; a retrieval unit that retrieves from the storage unit the dangerous driving incidents pertaining to the driver based on at least one of the types or the danger ratings; and a provision unit that provides to a user the evaluation information that has been generated by the generation unit and driving information pertaining to the dangerous driving incidents that have been retrieved by the retrieval unit.

In the driving evaluation device of the first aspect, the collection unit causes the driving information pertaining to the dangerous driving incidents acquired from the vehicle to be stored in the storage unit together with the types and the danger ratings of the dangerous driving incidents, and the generation unit generates the evaluation information pertaining to the driver of the vehicle based on the driving information collected from the vehicle. Here, the driving information includes driving data pertaining to the vehicle, such as speed and acceleration, and data of images captured in the vehicle. Furthermore, in this driving evaluation device, the provision unit provides the evaluation information to the user. Furthermore, when the retrieval unit retrieves the dangerous driving incidents pertaining to the driver, the provision unit provides to the user the driving information pertaining to the dangerous driving incidents that have been retrieved. Here, the retrieval unit performs the retrieval based on at least one of the types or the danger ratings of the dangerous driving incidents. According to this driving evaluation device, the user can browse information pertaining to dangerous driving incidents included in the basis of an evaluation of a certain driver by type and danger rating of the dangerous driving incidents.

A driving evaluation device of a second aspect is the driving evaluation device of the first aspect, wherein the provision unit, in a case in which a new dangerous driving incident has occurred, provides driving information pertaining to the new dangerous driving incident that has occurred.

In the driving evaluation device of the second aspect, the provision unit, in a case in which a new dangerous driving incident has occurred, provides driving information pertaining to the new dangerous driving incident that has occurred, so every time a dangerous driving incident occurs, the user can browse the information relating to the dangerous driving incident pertaining to the driver.

A driving evaluation system of a third aspect includes: the driving evaluation device of the first or second aspect; and a terminal carried by the user, wherein the terminal includes a receiving unit that receives a selection of one of the dangerous driving incidents by the user from a plurality of the dangerous driving incidents that have been retrieved by the retrieval unit and a control unit that causes an image of the driving information relating to the dangerous driving incident pertaining to the user's selection that the second processor has received to be displayed on a display unit viewable by the user.

In the driving evaluation system of the third aspect, in the terminal, when the receiving unit receives a selection of one of the dangerous driving incidents by the user, the control unit causes an image of the driving information relating to the dangerous driving incident pertaining to the user's selection to be displayed on the display unit. According to this driving evaluation system, the user can browse, in his/her hands, information relating to a dangerous driving incident that the user wants to browse.

A driving evaluation system of a fourth aspect is the driving evaluation system of the third aspect, wherein the driving information that is stored in the storage unit includes places of occurrence of the dangerous driving incidents, and the control unit causes an icon for indicating, at corresponding points on a map, the places of occurrence of the dangerous driving incidents and displaying images of the driving information corresponding to the dangerous driving incidents to be displayed on the display unit together with the map.

In the driving evaluation system of the fourth aspect, the control unit of the terminal causes the icon for displaying images of the driving information corresponding to the dangerous driving incidents to be displayed on the display unit together with the map. Here, the icon is displayed in points on the map corresponding to the places of occurrence of the dangerous driving incidents. According to this driving evaluation system, the user can browse the information relating to the dangerous driving incidents while comparing the information with the places of occurrence of the dangerous driving incidents on the map.

A driving evaluation system of a fifth aspect is the driving evaluation system of the third or fourth aspect, wherein the driving information that is stored in the storage unit includes dates and times of occurrence of the dangerous driving incidents, and the control unit, in a case in which the receiving unit has received a selection of one of the types from a plurality of the types, causes an image of the most recent driving information corresponding to the selected type to be displayed on the display unit.

In the driving evaluation system of the fifth aspect, the control unit of the terminal, in a case in which the receiving unit has received a selection of one of the types from a plurality of the types, causes an image of the most recent driving information corresponding to the selected type to be displayed on the display unit. For that reason, according to this driving evaluation system, the user can browse the most recent driving information by information relating to the dangerous driving incidents.

A driving evaluation method of a sixth aspect includes using a computer to execute a process to cause driving information pertaining to dangerous driving incidents collected from a vehicle to be stored in a storage unit together with types and danger ratings of the dangerous driving incidents, generate evaluation information pertaining to a driver of the vehicle based on the driving information collected from the vehicle, retrieve from the storage unit the dangerous driving incidents pertaining to the driver based on at least one of the types or the danger ratings, and provide to a user the evaluation information that has been generated and the driving information pertaining to the dangerous driving incidents that have been retrieved.

In the driving evaluation method of the sixth aspect, the computer causes the driving information pertaining to the dangerous driving incidents acquired from the vehicle to be stored in the storage unit together with the types and the danger ratings of the dangerous driving incidents and generates the evaluation information pertaining to the driver of the vehicle based on the driving information collected from the vehicle. Here, the driving information is as described above. Furthermore, in this driving evaluation method, the computer provides the evaluation information to the user. Furthermore, when the dangerous driving incidents pertaining to the driver are retrieved by the computer, the computer provides to the user the driving information pertaining to the dangerous driving incidents that have been retrieved. Here, the computer executes the retrieval based on at least one of the types or the danger ratings of the dangerous driving incidents. According to this driving evaluation method, the user can browse information pertaining to dangerous driving incidents included in the basis of an evaluation of a certain driver by type and danger rating of the dangerous driving incidents.

A driving evaluation program of a seventh aspect causes a computer to execute a process to cause driving information pertaining to dangerous driving incidents collected from a vehicle to be stored in a storage unit together with types and danger ratings of the dangerous driving incidents, generate evaluation information pertaining to a driver of the vehicle based on the driving information collected from the vehicle, retrieve from the storage unit the dangerous driving incidents pertaining to the driver based on at least one of the types or the danger ratings, and provide to a user the evaluation information that has been generated and the driving information pertaining to the dangerous driving incidents that have been retrieved.

In the driving evaluation program of the seventh aspect, the computer executes the following process. That is, the computer causes the driving information pertaining to the dangerous driving incidents acquired from the vehicle to be stored in the storage unit together with the types and the danger ratings of the dangerous driving incidents and generates the evaluation information pertaining to the driver of the vehicle based on the driving information collected from the vehicle. Here, the driving information is as described above. Furthermore, in this program, the computer provides the evaluation information to the user. Furthermore, when the dangerous driving incidents pertaining to the driver are retrieved by the computer, the computer provides to the user the driving information pertaining to the dangerous driving incidents that have been retrieved. Here, the computer executes the retrieval based on at least one of the types or the danger ratings of the dangerous driving incidents. According to this driving evaluation program, the user can browse information pertaining to dangerous driving incidents included in the basis of an evaluation of a certain driver by type and danger rating of the dangerous driving incidents.

According to this disclosure, the user can browse information pertaining to dangerous driving incidents included in the basis of an evaluation of a certain driver by type and danger rating of the dangerous driving incidents.

BRIEF DESCRIPTION OF THE DRAWINGS

An exemplary embodiment of the disclosure will be described in detail based on the following figures, wherein.

DETAILED DESCRIPTION

A driving evaluation system including a driving evaluation device of this disclosure will now be described using the drawings.

Figure 1:
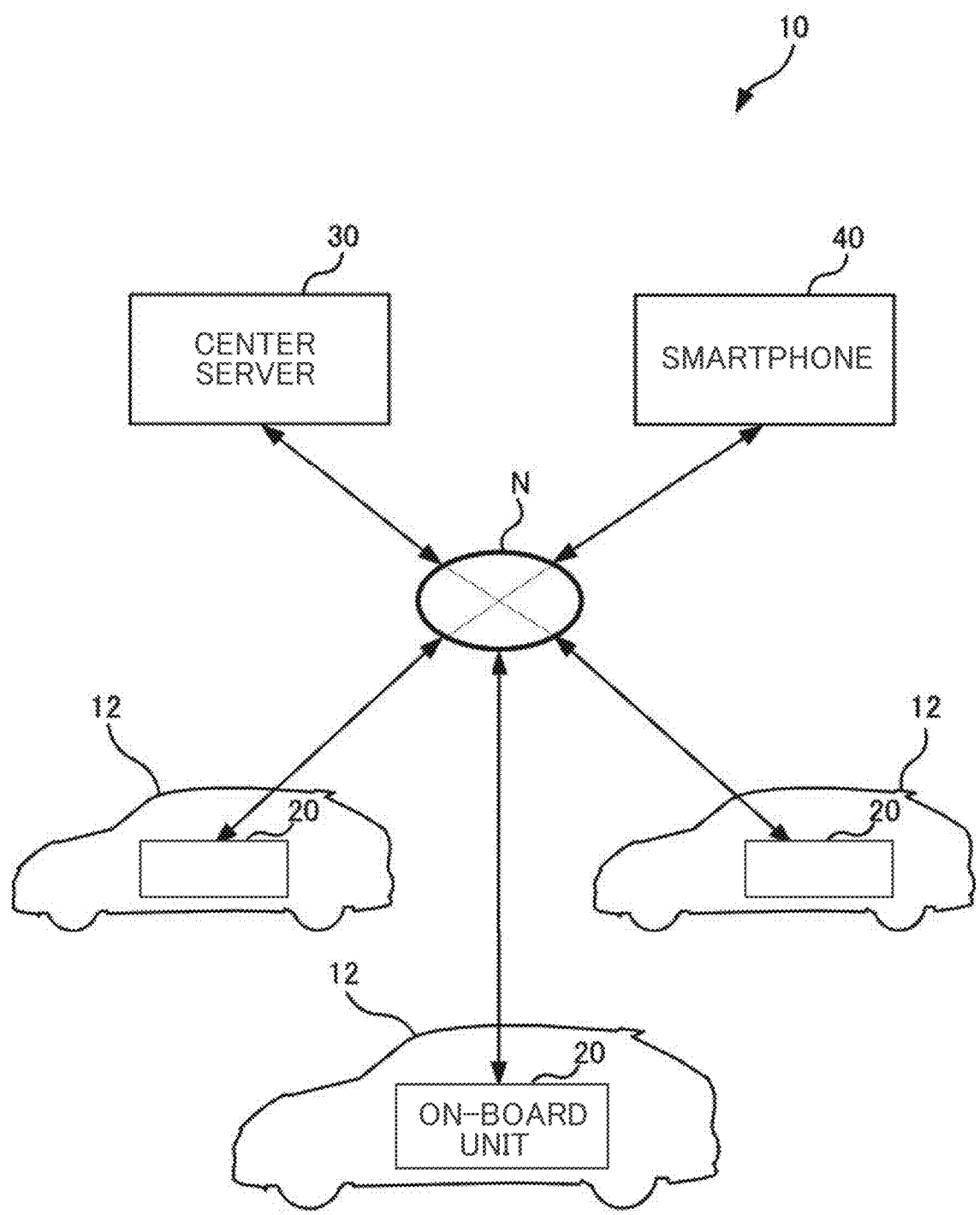
FIG. 1 is a drawing showing the schematic configuration of a driving evaluation system pertaining to the embodiment.

As shown in FIG. 1, a driving evaluation system 10 of an embodiment of this disclosure is configured to include a plurality of vehicles 12, a center server 30 serving as a driving evaluation device and a smartphone 40 serving as a terminal. Each vehicle 12 is equipped with an on-board unit 20. The smartphone 40 is a communication terminal carried by a user who utilizes an application. It will be noted that the terminal that executes the application is not limited to a smartphone and may also be a communication terminal such as a tablet or a personal computer for example.

The plural on-board units 20, the center server 30, and the smartphone 40 are connected to each other through a network N.

(Vehicle)

Figure 2:
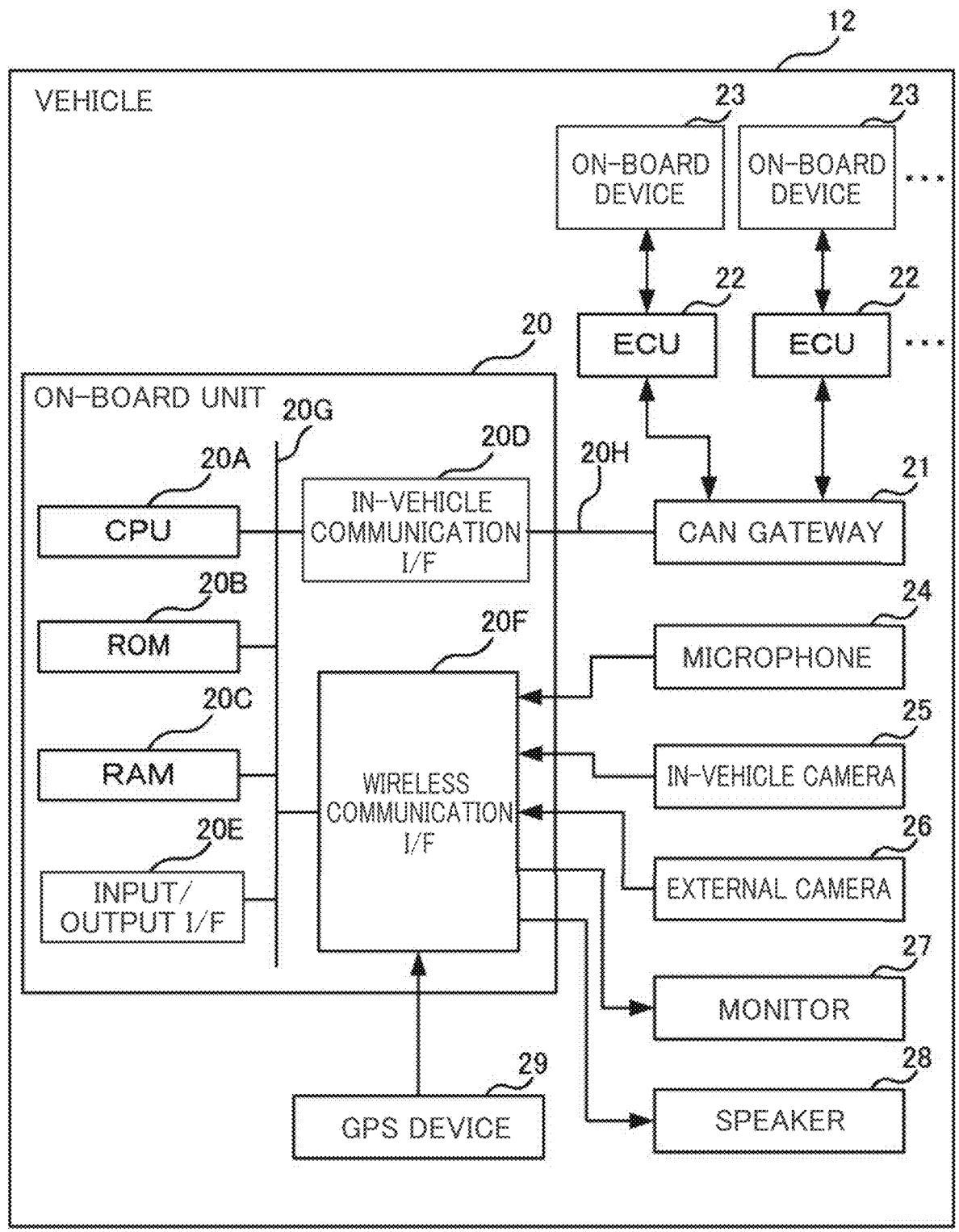
FIG. 2 is a block diagram showing hardware configurations of a vehicle of the embodiment.

As shown in FIG. 2, the vehicle 12 pertaining to this embodiment is configured to include the on-board unit 20, a controller area network (CAN) gateway 21, plural ECUs 22, and plural on-board devices 23. Furthermore, the vehicle 12 is configured to include a microphone 24, an in-vehicle camera 25, an external camera 26, a monitor 27, a speaker 28, and a GPS device 29.

The on-board unit 20 is configured to include a central processing unit (CPU) 20A, a read-only memory (ROM) 20B, a random-access memory (RAM) 20C, an in-vehicle communication interface (I/F) 20D, a wireless communication I/F 20E, and an input/output I/F 20F. The CPU 20A, the ROM 20B, the RAM 20C, the in-vehicle communication I/F 20D, the wireless communication I/F 20E, and the input/output I/F 20F are communicably connected to each other via an internal bus 20G.

The CPU 20A is a central processing unit, executes various programs, and controls each part of the on-board unit 20. That is, the CPU 20A reads programs from the ROM 20B and executes the programs using the RAM 20C as a work area.

The ROM 20B stores various programs and various data. The ROM 20B of this embodiment stores a control program for controlling the on-board unit 20.

The RAM 20C temporarily stores programs or data as a work area.

The in-vehicle communication I/F 20D is an interface for connecting to the CAN gateway 21. The interface uses the CAN protocol communication standard. The in-vehicle communication I/F 20D is connected to an external bus 20H.

The CAN gateway 21 is a relay that interconnects the on-board unit 20 and the plural ECUs 22. The plural ECUs 22 are provided for each function of the vehicle 12. Examples of the ECUs 22 of this embodiment include a vehicle control ECU, an engine ECU, a brake ECU, a body ECU, a driving assist ECU, a camera ECU, and a multimedia ECU.

Furthermore, connected to each of the ECUs 22 are the on-board devices 23. The on-board devices 23 are devices for realizing the functions of the vehicle 12. For example, connected to the engine ECU is a throttle actuator serving as an on-board device 23, and connected to the brake ECU is a brake actuator serving as an on-board device 23. Furthermore, connected to the body ECU are an ignition device and a wiper device serving as on-board devices 23. Furthermore, connected to the driving assist ECU are a vehicle speed sensor and an acceleration sensor serving as on-board devices 23.

The wireless communication I/F 20E is a wireless communication module for communicating with the center server 30. The wireless communication module uses a communication standard such as 5G LTE, or Wi-Fi (registered trademark). The wireless communication I/F 20E is connected to a network N.

The input/output I/F 20F is an interface for communicating with the microphone 24, the in-vehicle camera 25, the external camera 26, the monitor 27, the speaker 28, and the GPS device 29 installed in the vehicle 12.

The microphone 24, which serves as a speech input device, is provided in the front pillars or the dashboard, for example, of the vehicle 12, and is a device that picks up the speech of an occupant including the driver of the vehicle 12. It will be noted that the microphone 24 may also be provided in the in-vehicle camera 25 described later.

The in-vehicle camera 25, which serves as an image capturing device, is provided in the front pillars, the rear-view mirror, or the steering column, for example, of the vehicle 12, and is a device that captures an image of the occupant of the vehicle 12. It will be noted that the in-vehicle camera 25 may also be connected to the on-board unit 20 via an ECU 22 (e.g., the camera ECU).

The external camera 26 is a device that is provided on the upper portion of the windshield or the rear-view mirror, for example, of the vehicle 12, and is a device that captures an image of the outside of the vehicle 12. The external camera 26 may also be provided as a sensor group configuring a driving assist system together with a millimeter-wave radar and a laser imaging detection and ranging (LIDAR) system. In this case, the external camera 26 may also be connected to the on-board unit 20 via an ECU 22 (e.g., the driving assist ECU). Furthermore, the external camera 26 may also be provided as a camera configuring a drive recorder. In this case, the external camera 26 is connected to the on-board unit 20 via the drive recorder.

The monitor 27 is provided in the instrument panel or the meter panel, for example, and is a liquid crystal monitor for displaying proposals for operations pertaining to the functions of the vehicle 12 and images pertaining to descriptions of those functions. The monitor 27 may also be provided as a touch panel doubling as an input switch.

The speaker 28 is provided in the instrument panel, the center console, the front pillars, or the dashboard, for example, and is a device for outputting audio. It will be noted that the speaker 28 may also be provided in the monitor 27.

The GPS device 29 is a device that calculates the current position of the vehicle 12. The GPS device 29 includes an antenna (not shown in the drawings) that receives signals from GPS satellites. It will be noted that the GPU device 29 may also be connected to the on-board unit 20 via a car navigation system connected to an ECU 22 (e.g., the multimedia ECU).

(Center Server)

Figure 3:
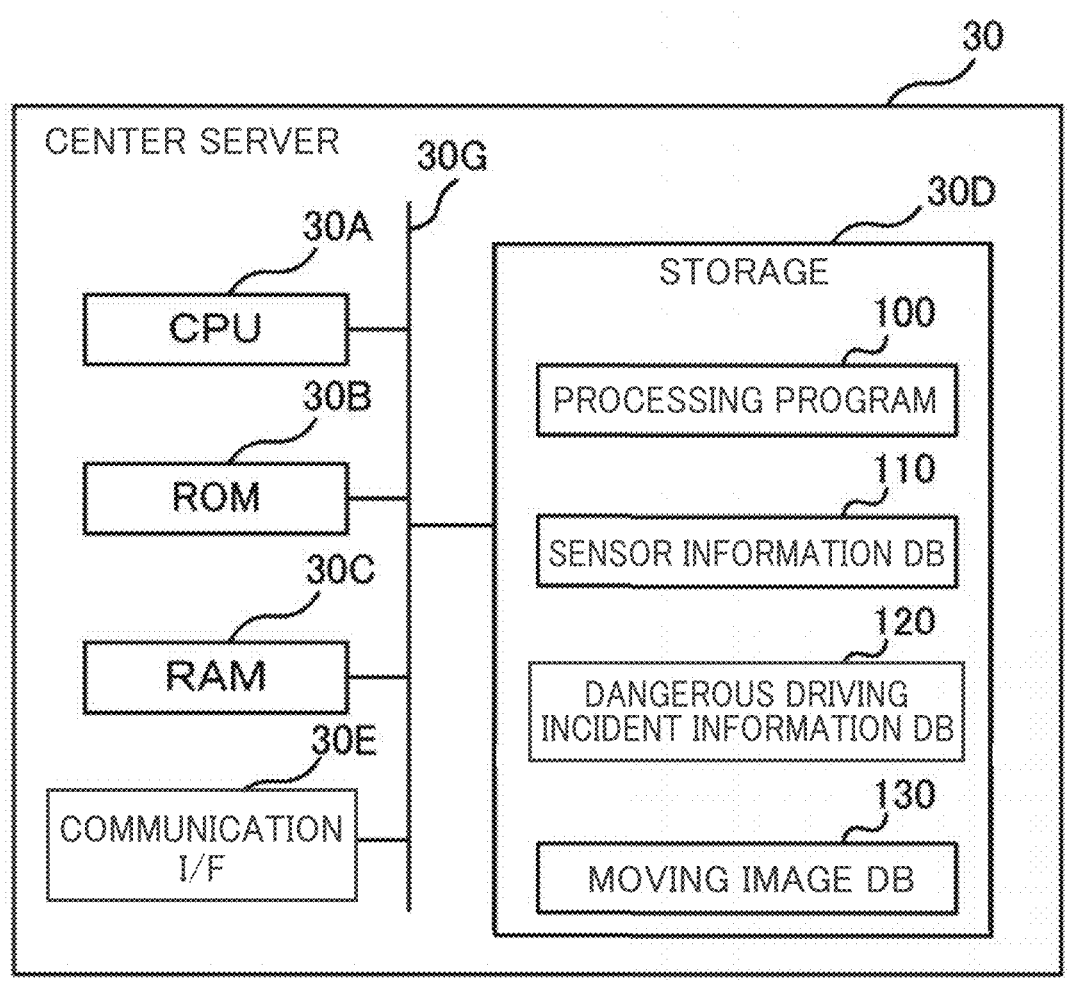
FIG. 3 is a block diagram showing hardware configurations of a center server of the embodiment.

As shown in FIG. 3, the center server 30 is configured to include a CPU 30A, a ROM 30B, a RAM 30C, a storage 30D, and a communication I/F 30E. The CPU 30A, the ROM 30B, the RAM 30C, the storage 30D, and the communication I/F 30E are communicably connected to each other via an internal bus 30G The functions of the CPU 30A, the ROM 30B, the RAM 30C, and the communication I/F 30E are the same as those of the CPU 20A, the ROM 20B, the RAM 20C, and the wireless communication I/F 20E of the on-board unit 20 described above.

The storage 30D, which serves as a storage unit, is configured by a hard disk drive (HDD) or a solid-state drive (SSD) and stores various programs and various data.

The CPU 30A, which serves as a first processor, reads programs from the storage 30D, which serves as a first memory, and executes the programs using the RAM 30C as a work area.

The storage 30D of this embodiment stores a processing program 100, a sensor information database (DB) 110, a dangerous driving incident information DB 120, and a moving image DB 130.

The processing program 100, which serves as a driving evaluation program, is a program for realizing the functions that the center server 30 has.

The sensor information DB 110 is a database in which driving information acquired from the on-board devices 23 serving as sensors of the vehicle 12 is consolidated. For example, the sensor information DB 110 stores CAN information and position information of the vehicle 12 at arbitrary times as the driving information. The CAN information is communication data sent and received through the external bus 20H of the vehicle 12, and includes vehicle speed signals, acceleration signals, and accelerator pedal position signals, for example. Based on the CAN information, the speed and acceleration, for example, of the vehicle 12 can be obtained.

The dangerous driving incident information DB 120 is a database in which, of the driving information stored in the sensor information DB 110, driving information at times of dangerous driving incidents is consolidated. In the dangerous driving incident information DB 120, the CAN information, dates and times of occurrence of the dangerous driving incidents, and position information of the vehicle 12 at the times of occurrence are stored as the driving information together with types and danger ratings of the dangerous driving incidents. Also stored in the dangerous driving incident information DB 120 are addresses for referring to image data at the times of occurrence of the dangerous driving incidents in the moving image DB 130 described later.

The moving image DB 130 is a database in which image data serving as the driving information—specifically, image data of moving images that have been captured by the external camera 26 of the vehicle 12—is consolidated.

Figure 4:
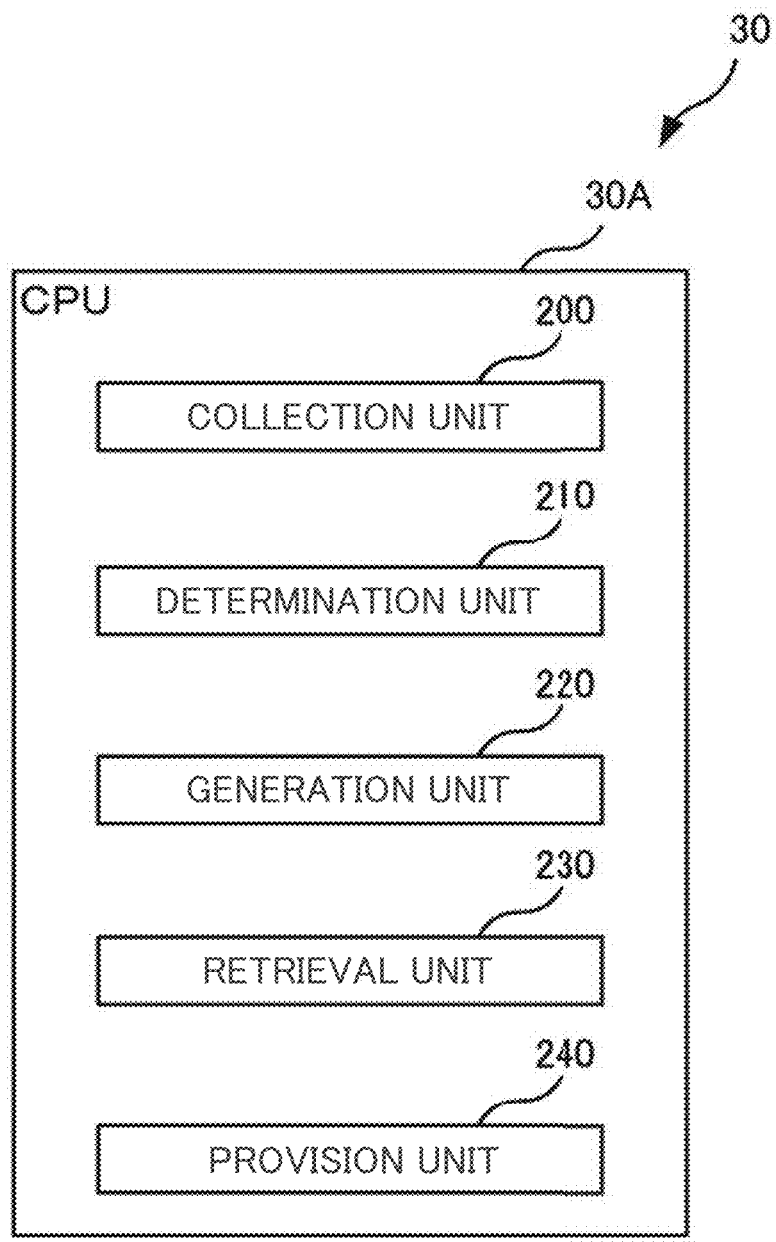
FIG. 4 is a block diagram showing functional configurations of the center server of the embodiment.

As shown in FIG. 4, in the center server 30 of this embodiment, the CPU 30A functions as a collection unit 200, a determination unit 210, a generation unit 220, a retrieval unit 230, and a provision unit 240 by executing the processing program 100.

The collection unit 200 has the function of acquiring the driving information from the vehicle 12. Furthermore, the collection unit 200 stores, in the dangerous driving incident information DB 120 together with the types and danger ratings of the dangerous driving incidents determined by the determination unit 210 described later, driving information pertaining to the dangerous driving incidents of the driving information it has received.

The determination unit 210 has the function of determining whether or not a dangerous driving incident has occurred based on the driving information acquired from the vehicle 12. For example, the determination unit 210 determines that a dangerous driving incident has occurred in a case in which it has detected from the driving information that the driver has made a sudden operation with respect to the vehicle 12, a case in which it has detected from the driving information that the driver has obstructed the walking of a pedestrian or the driving of an area vehicle, and a case in which it has detected from the driving information that the driver has failed to stop at a stop sign or has run a red light.

It will be noted that examples of methods of detecting that the driver has made a sudden operation include detecting that a physical quantity, such as the speed or acceleration of the vehicle 12, or a manipulated variable, such as the steering wheel or the brakes, has exceeded a threshold value. Furthermore, examples of methods of detecting that the driver has obstructed the walking of a pedestrian or the driving of an area vehicle and that the driver has failed to stop at a stop sign or has run a red light include analyzing the image data of the external camera 26.

Furthermore, the determination unit 210 has the function of determining types and danger ratings of the dangerous driving incidents. Here, "types" of the dangerous driving incidents means forms of dangerous driving. Examples of types include speeding, obstructing a pedestrian, and running a red light. Furthermore, "danger ratings" means degrees of the dangerous driving incidents by type. In this embodiment, there are three degrees: "high," "intermediate," and "low."

The generation unit 220 has the function of generating a score, which is evaluation information pertaining to the driver based on the driving information. For example, the generation unit 220 generates the score based on standard scores, with respect to parameters for all drivers, of parameters such as the number, frequency, and degree of occurrences of dangerous driving incidents pertaining to a certain driver.

The retrieval unit 230 has the function of retrieving the dangerous driving incidents based on at least one of the times of occurrence, the types, or the danger ratings of the dangerous driving incidents. For example, the retrieval unit 230 has the function of retrieving the dangerous driving incidents whose type is running a red light or retrieving the dangerous driving incidents whose danger rating is "high" based on a retrieval command from the smartphone 40.

The provision unit 240 has the function of providing, to the smartphone 40 carried by the user, the score that has been generated by the generation unit 220 and the driving information pertaining to the dangerous driving incidents. The provision unit 240, in a case in which the dangerous driving incidents have been retrieved by the retrieval unit 230, provides to the smartphone 40 the retrieval results corresponding to the dangerous driving incidents. Furthermore, the provision unit 240, in a case in which a new dangerous driving incident has occurred, provides driving information pertaining to the new dangerous driving incident that has occurred.

(Smartphone)

The smartphone 40 is a terminal carried by the user who utilizes the application. The application of this embodiment allows the user to browse the evaluation of a preregistered driver and is configured, in a case in which a dangerous driving incident has occurred, to be able to play a moving image pertaining to the dangerous driving incident.

Figure 5:
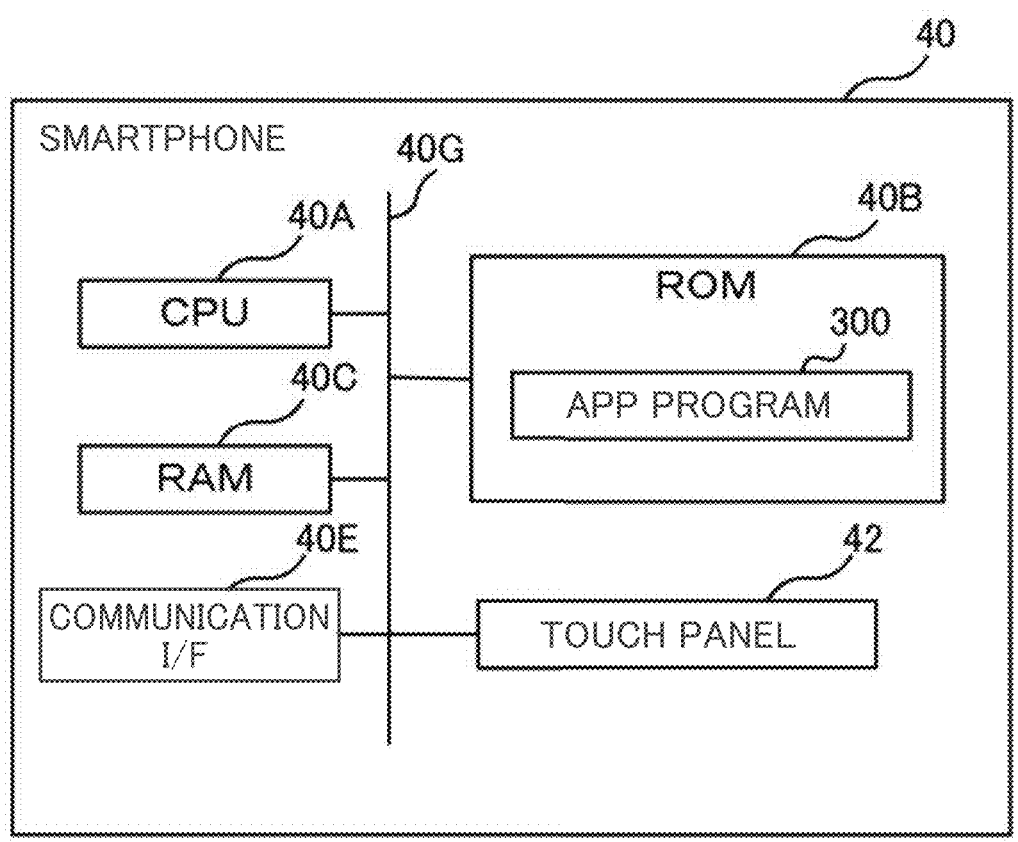
FIG. 5 is a block diagram showing hardware configurations of a smartphone of the embodiment.

As shown in FIG. 5, the smartphone 40 of this embodiment is configured to include a CPU 40A, a ROM 40B, a RAM 40C, a communication I/F 40E, and a touch panel 42. The CPU 40A, the ROM 40B, the RAM 40C, the communication I/F 40E, and the touch panel 42 are communicably connected to each other via an internal bus 40G The functions of the CPU 40A, the ROM 40B, the RAM 40C, and the communication I/F 40E are the same as those of the CPU 20A, the ROM 20B, the RAM 20C, and the wireless communication I/F 20E of the on-board unit 20 described above.

The touch panel 42, which serves as a display unit, is configured to include a liquid crystal screen viewable by the user and a touch sensor. That is, the touch panel 24 also functions as an input unit that receives operations performed by the user.

The CPU 40A, which serves as a second processor, reads programs from the ROM 40B, which serves as a second memory, and executes the programs using the RAM 40C as a work area.

The ROM 40B of this embodiment stores an app program 300.

Figure 6:
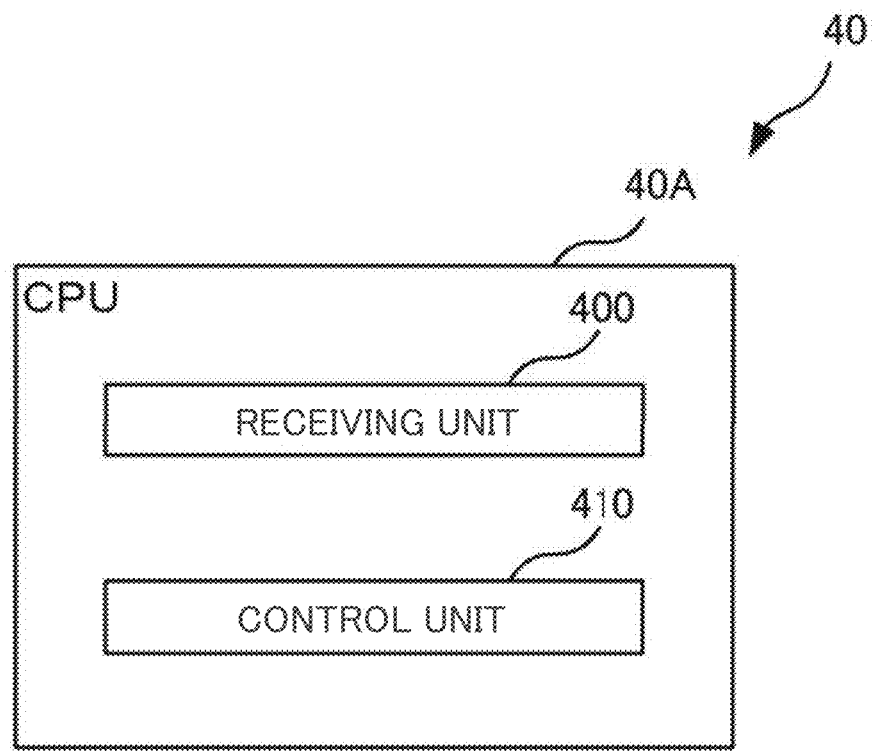
FIG. 6 is a block diagram showing functional configurations of the smartphone of the embodiment.

As shown in FIG. 6, in the smartphone 40 of this embodiment, the CPU 40A functions as a receiving unit 400 and a control unit 410 by executing the app program 300.

The receiving unit 400 has the function of receiving operations performed by the user with respect to the touch panel 42. The receiving unit 400 receives a selection of one of the dangerous driving incidents by the user from a list of the dangerous driving activities displayed on the touch panel 42 as a result of being retrieved by the retrieval unit 230 of the center server 30.

The control unit 410 has the function of controlling what is displayed on the touch panel 42. Furthermore, the control unit 410, in a case in which the receiving unit 400 has received a selection of one of the dangerous driving incidents, causes a moving image pertaining to the dangerous driving incident it has received to be displayed on the touch panel 42.

Figure 7:
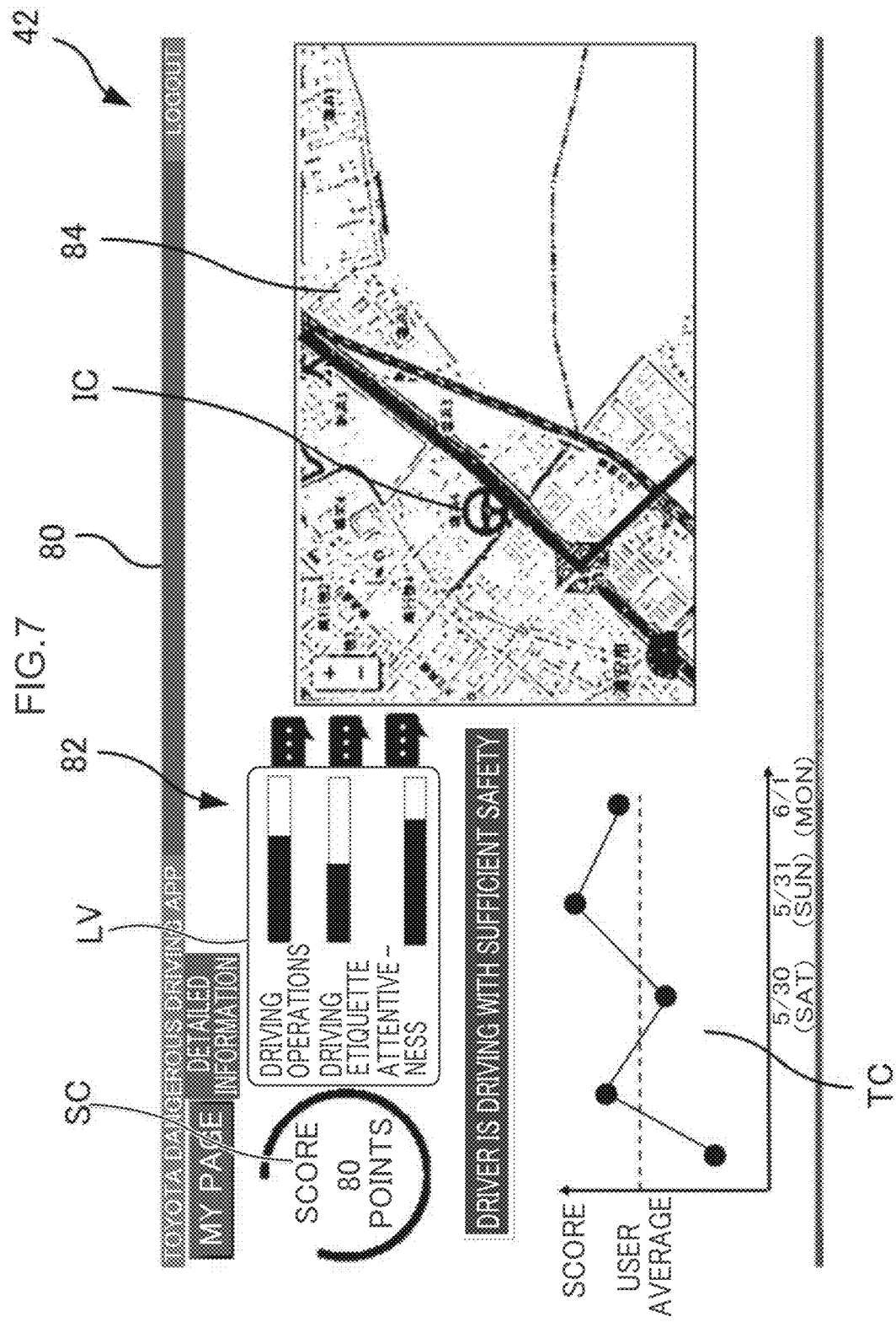
FIG. 7 shows an example of what is displayed on a screen upon startup of an application in the smartphone of the embodiment.

As shown in FIG. 7, an app screen 80 is displayed on the touch panel 42 by the control unit 410. The app screen 80 includes an information screen 82 and a map screen 84. In the app screen 80 upon startup of the app, the information screen 82 includes a score image SC, a level image LV, and a time chart TC. The score image SC is an image pertaining to the score of the driver that has been generated in the generation unit 220 of the center server 30. The level image LV is an image showing score levels by category. The categories include "driving operations," "driving etiquette," and "attentiveness." The time chart TC is an image pertaining to a line graph showing changes in the score in a time series.

Furthermore, in this embodiment, an icon IC indicating the location of occurrence of a dangerous driving incident is displayed on the map screen 84, which has an image of a map. The icon IC is a button for indicating, in a corresponding point on the map screen 84, the place of occurrence of the dangerous driving incident and for displaying a moving image corresponding to the dangerous driving incident. The control unit 410 causes the icon IC to be displayed together with the map on the map screen 84 and, in a case in which the icon IC has been operated, causes the moving image of the dangerous driving incident that occurred at the location of the icon IC to be displayed on a moving image screen 86 (see FIG. 8).

Figure 8:
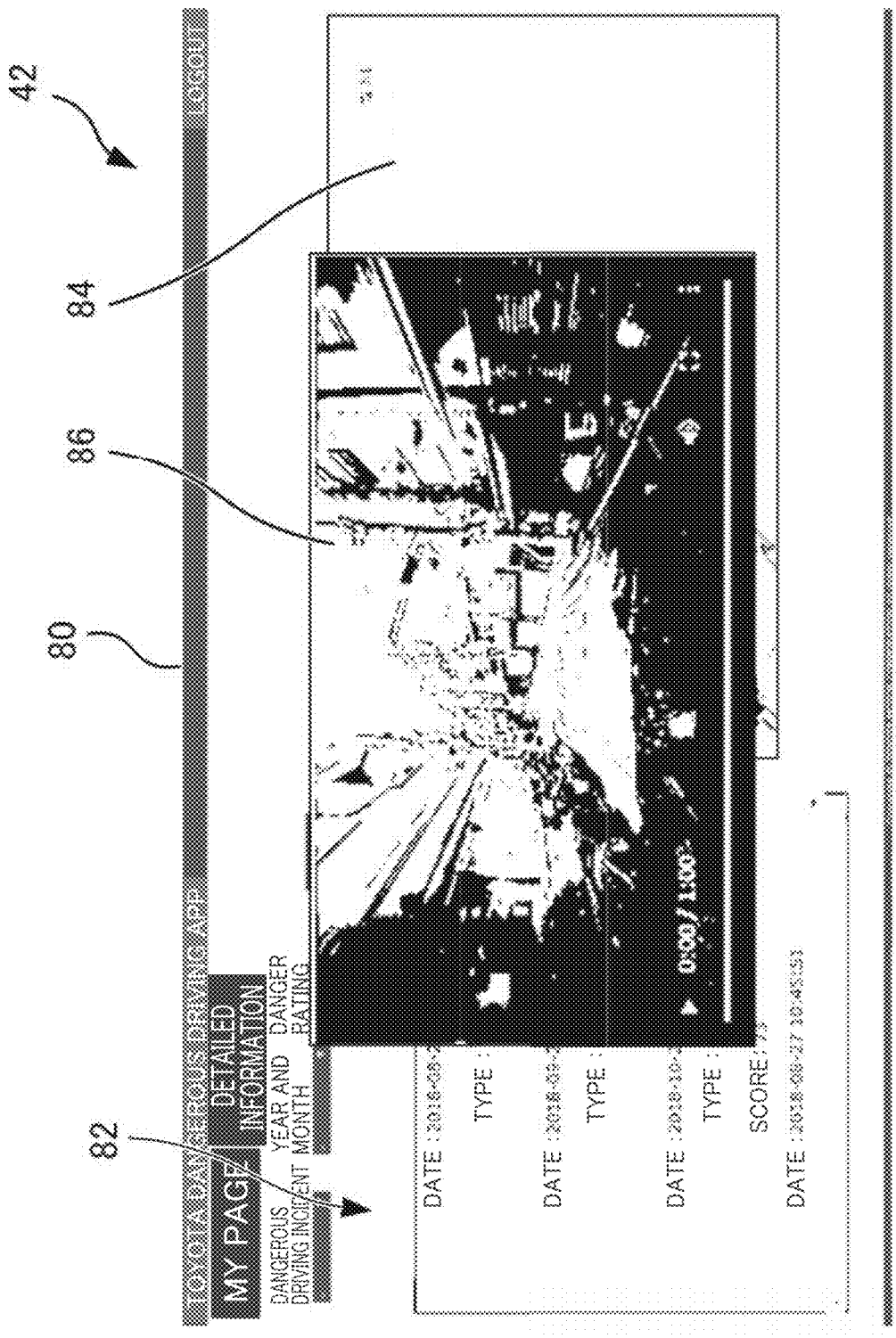
FIG. 8 shows an example of what is displayed on the screen when playing back a moving image in the smartphone of the embodiment.
Figure 9:
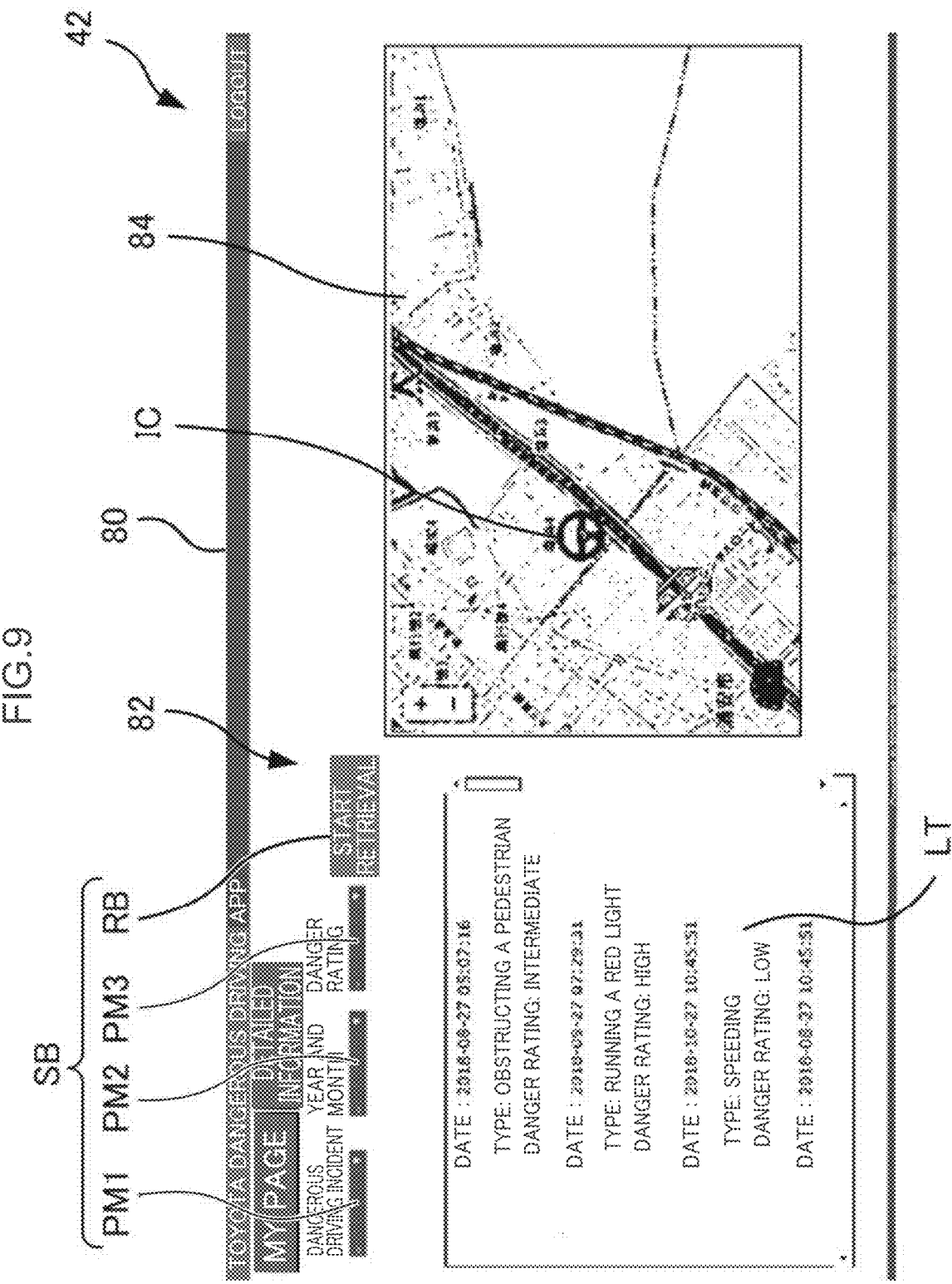
FIG. 9 shows an example of what is displayed on the screen when performing a search in the smartphone of the embodiment.

Furthermore, as shown in FIG. 9, on the app screen 80 is displayed the information screen 82 including a list image LT, which includes a list of the dangerous driving incidents and comprises selectable text, and search buttons SB, which are for searching the dangerous driving incidents. In a case in which the receiving unit 400 has received a selection of text pertaining to one of the dangerous driving incidents as a result of the user operating the list image LT, the control unit 410 causes a moving image of the dangerous driving incident to be displayed on the moving image screen 86 (see FIG. 8).

Moreover, in a case in which the receiving unit 400 has received a selection of one of the types from a plurality of the types as a result of the user operating the search buttons SB, the control unit 410 causes the most recent moving image corresponding to the selected type to be displayed on the moving image screen 86 on the touch panel 42 (see FIG. 8). Here, the search buttons SB of this embodiment include a pull-down menu PM1 for selecting the types of the dangerous driving incidents, a pull-down menu PM2 for selecting the years and months of occurrence of the dangerous driving incidents, a pull-down menu PM3 for selecting the danger ratings, and a retrieval start button RB. By operating the pull-down menu PM1, selecting a type of the dangerous driving incidents, and operating the retrieval start button RB, the receiving unit 400 receives a selection of one of the types from a plurality of the types.

(Control Flows)

Flows of processes executed in the driving evaluation system 10 of this embodiment will now be described using the flowcharts of FIG. 10, FIG. 11, FIG. 12, FIG. 13A, and FIG. 13B.

First, in the center server 30, an evaluation generation process of acquiring the driving information from the on-board units 20 of the plural vehicles 12 and performing evaluations of dangerous driving incidents is executed. This process is realized by the CPU 30A functioning as the collection unit 200, the determination unit 210, and the generation unit 220.

Figure 10:
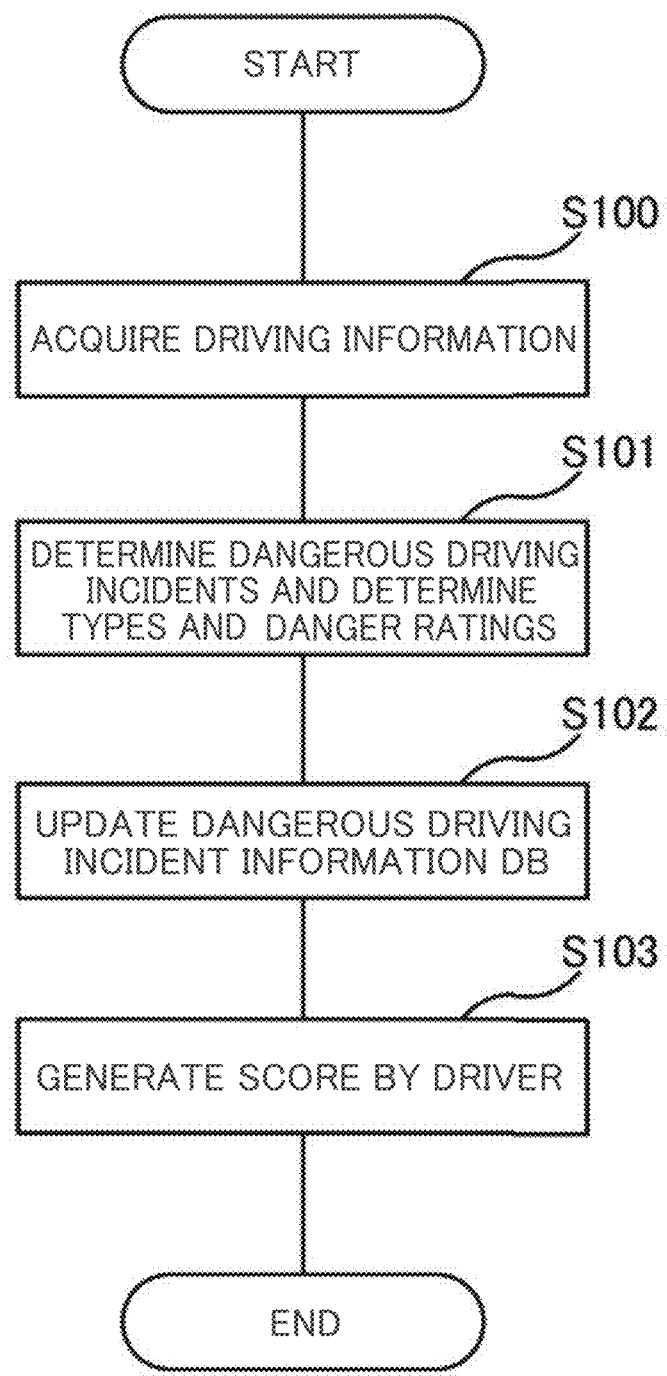
FIG. 10 is a flowchart showing the flow of an evaluation generation process executed in the center server of the embodiment.

In step S100 of FIG. 10, the CPU 30A of the center server 30 receives and acquires the driving information from each on-board unit 20. The driving information includes at least the aforementioned CAN information, position information, and image data of the moving images.

In step S101, the CPU 30A determines the dangerous driving incidents as well as the types and the danger ratings of the dangerous driving incidents. Because of this, it is determined whether or not certain driving incidents pertaining to certain drivers correspond to dangerous driving incidents. Furthermore, in a case in which they correspond to dangerous driving incidents, it is determined whether the types of the dangerous driving incidents are speeding, obstructing a pedestrian, running a red light, or something else, and whether the danger ratings are "high," "intermediate," or "low."

In step S102, the CPU 30A updates the dangerous driving incident information DB 120. That is, the CAN information, the dates and times of occurrence of the dangerous driving incidents, and the positions of the vehicles 12 at the times of occurrence are stored in the dangerous driving incident information DB 120 together with the types and the danger ratings of the dangerous driving incidents.

In step S103, the CPU 30A generates scores for each driver. Then, the evaluation generation process ends.

As described above, in the evaluation generation process, the center server 30 collects the driving information, determines and stores the dangerous driving incidents, and generates scores for the drivers. The evaluation generation process may also be continuously executed to collect the driving information as necessary from the on-board units 20 of the vehicles 12, but in order to reduce the volume of communication between the on-board units 20 and the center server 30, it is better for the evaluation generation process to be executed periodically, such as about once every 10 minutes for example.

Next, in the center server 30, a notification start process and an information provision process are executed. These processes are realized by the CPU 30A functioning as the retrieval unit 230 and the provision unit 240.

Figure 11:
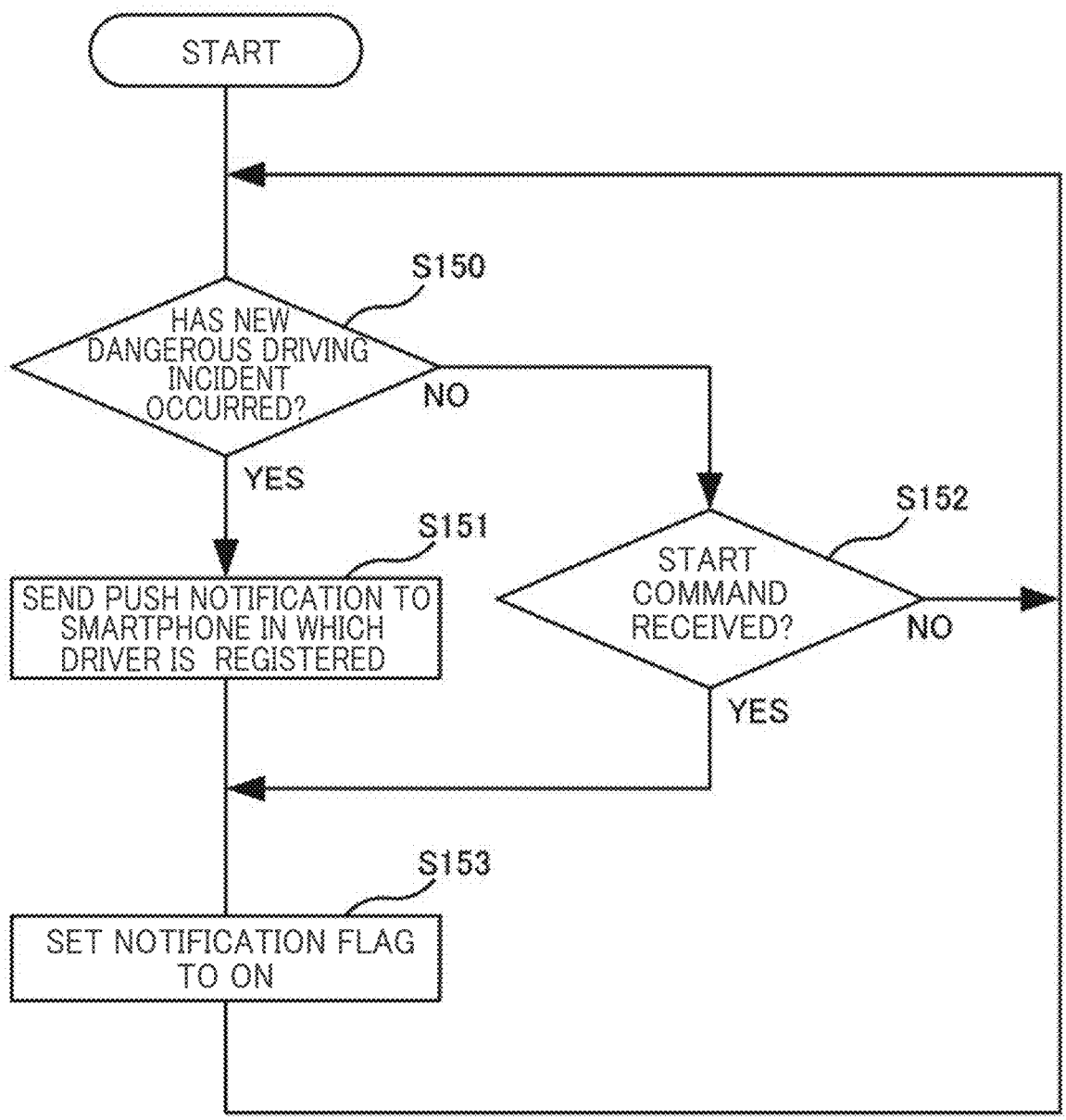
FIG. 11 is a flowchart showing the flow of a notification start process executed in the center server of the embodiment.

First, as shown in FIG. 11, the notification start process is executed.

In step S150 of FIG. 11, the CPU 30A determines whether or not a new dangerous driving incident has occurred. The CPU 30A proceeds to step S151 in a case in which it has determined that a new dangerous driving incident has occurred (in the case of YES in step S150). The CPU 30A proceeds to step S152 in a case in which it has determined that a new dangerous driving incident has not occurred (in the case of NO in step S150).

In step S151, the CPU 30A sends a push notification to the smartphone 40 in which the driver pertaining to the dangerous driving incident is registered. Here, in the app in the smartphone 40, the driver about whom notification is to be certain is registered, and in a case in which the registered driver is responsible for the new dangerous driving incident (in the case of YES in step S150), the CPU 30A sends a push notification to the smartphone 40 in which that driver is registered.

In step S152, the CPU 30A determines whether or not it has received from the smartphone 40 a start command to start the app. The CPU 30A proceeds to step S153 in a case in which it has determined that it has received a start command (in the case of YES in step S152). The CPU 30A returns to step S150 in a case in which it has determined that it has not received a start command (in the case of NO in step S152).

In step S153, the CPU 30A sets a notification flag to ON. Then, the CPU 30A returns to step S150. The notification flag is a flag for executing the information provision process described later.

As described above, in the notification start process, the center server 30 decides to provide the driving information using the notification flag in a case in which a new dangerous driving incident has occurred or in a case in which it has been notified by the smartphone 40 to start the app.

Figure 12:
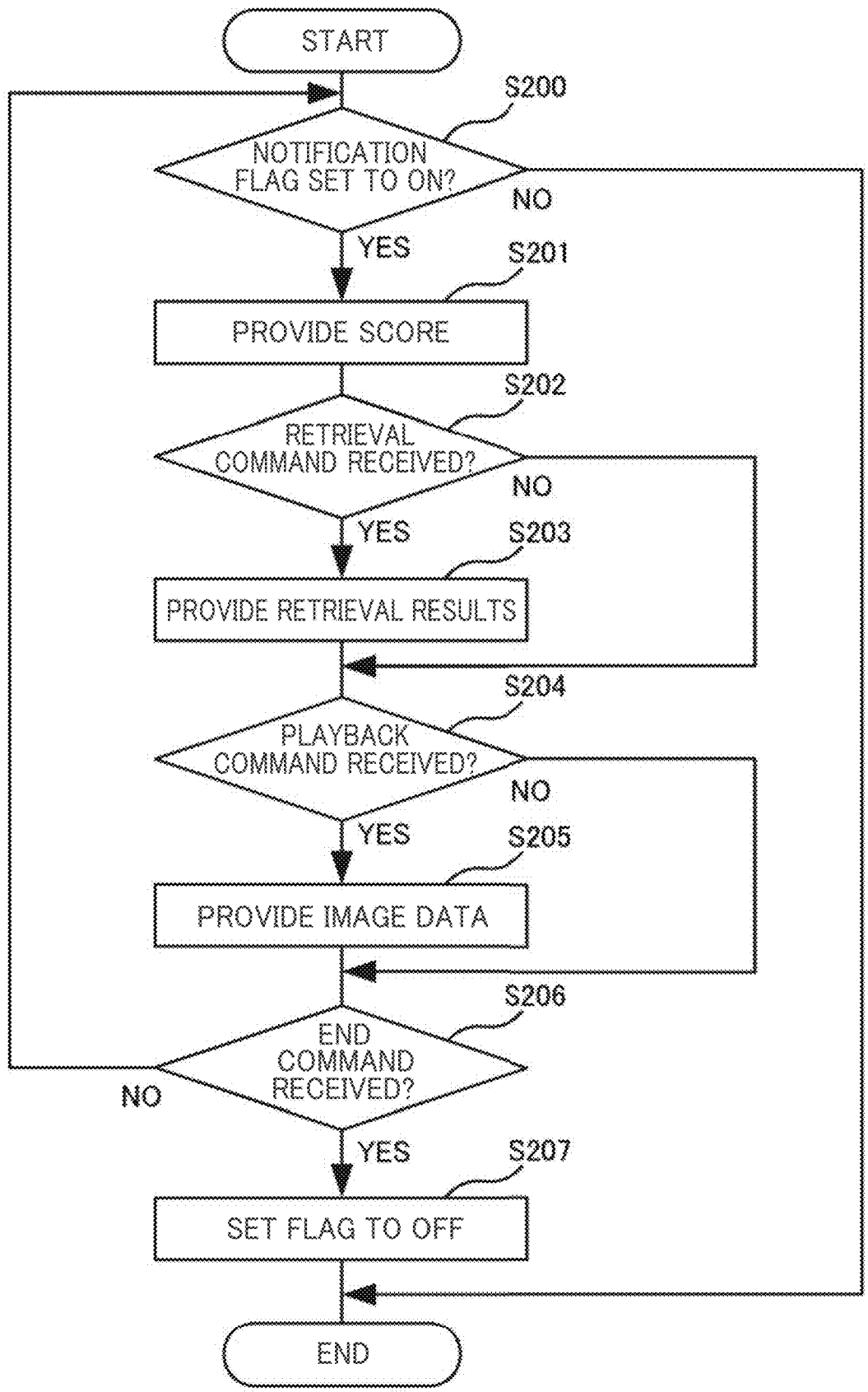
FIG. 12 is a flowchart showing the flow of an information provision process executed in the center server of the embodiment.

Next, as shown in FIG. 12, the information provision process is executed.

In step S200 of FIG. 12, the CPU 30A of the center server 30 determines whether or not the notification flag is set to ON. The CPU 30A proceeds to step S201 in a case in which it has determined that the notification flag is set to ON (in the case of YES in step S200). The CPU 30A ends the information provision process in a case in which it has determined that the notification flag is not set to ON, that is, is set to OFF (in the case of NO in step S200).

In step S201, the CPU 30A provides the score. Specifically, the CPU 30A sends to the smartphone 40 the score of the driver registered in that smartphone 40.

In step S202, the CPU 30A determines whether or not it has received a retrieval command. The CPU 30A proceeds to step S203 in a case in which it has determined that it has received a retrieval command (in the case of YES in step S202). The CPU 30A proceeds to step S204 in a case in which it has determined that it has not received a retrieval command (in the case of NO in step S202).

In step S203, the CPU 30A provides the retrieval results to the smartphone 40 that sent the retrieval command. That is, the CPU 30A sends the driving information pertaining to the dangerous driving incident specified by the retrieval process.

In step S204, the CPU 30A determines whether or not it has received a playback command. The CPU 30A proceeds to step S205 in a case in which it has determined that it has received a playback command (in the case of YES in step S204). The CPU 30A proceeds to step S206 in a case in which it has determined that it has not received a playback command (in the case of NO in step S204).

In step S205, the CPU 30A provides the image data to the smartphone 40 that sent the playback command. That is, the CPU 30A sends the image data of the moving image that is to be played back to the smartphone 40.

In step S206, the CPU 30A determines whether or not it has received an end command. The CPU 30A proceeds to step S207 in a case in which it has determined that it has received an end command (in the case of YES in step S206). The CPU 30A returns to step S200 in a case in which it has determined that it has not received an end command (in the case of NO in step S206).

In step S207, the CPU 30A sets the notification flag to OFF. Then, the information provision process ends.

Figure 13A:
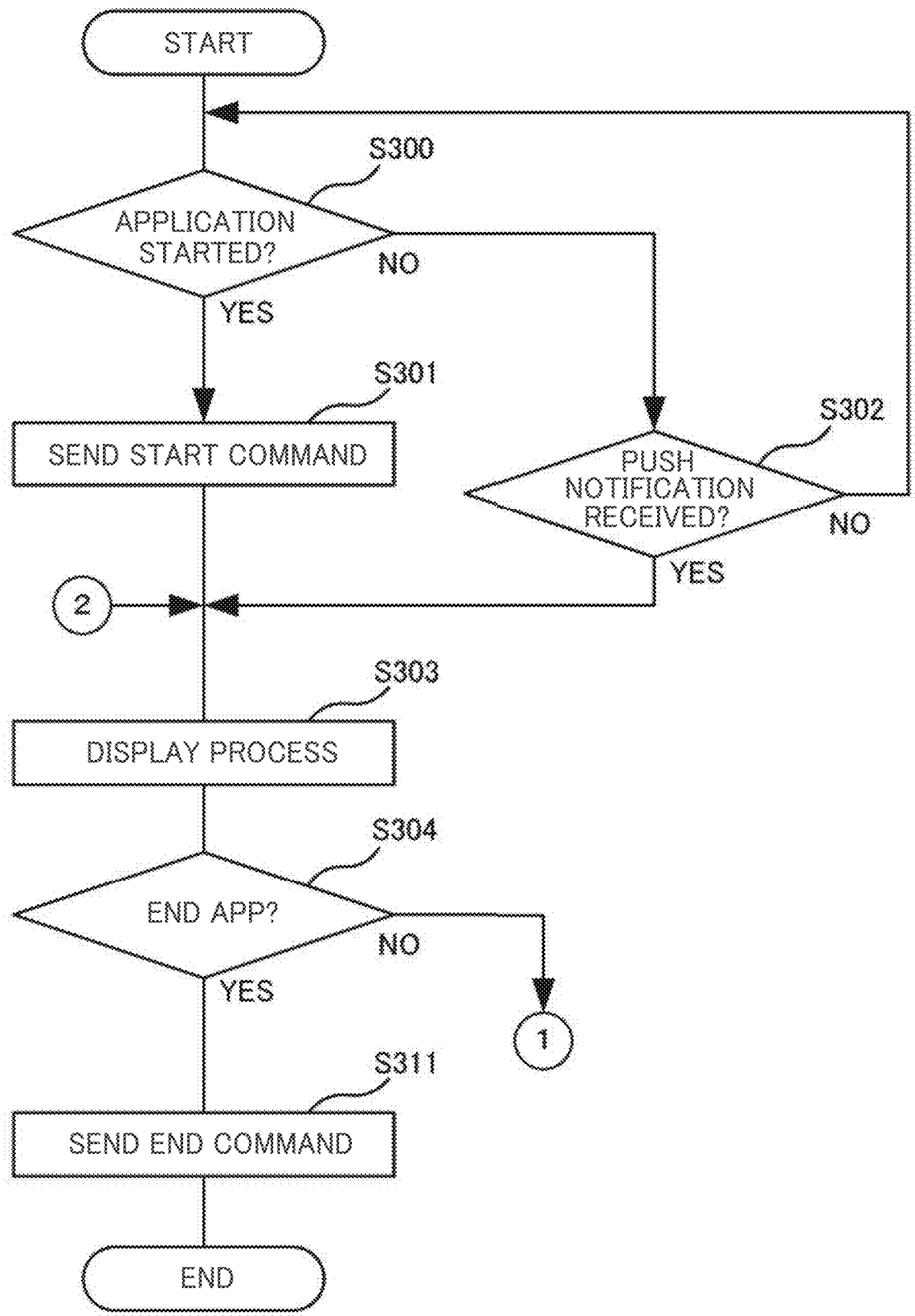
FIG. 13A is a flowchart showing the flow of an information browsing process executed in the smartphone of the embodiment.
Figure 13B:
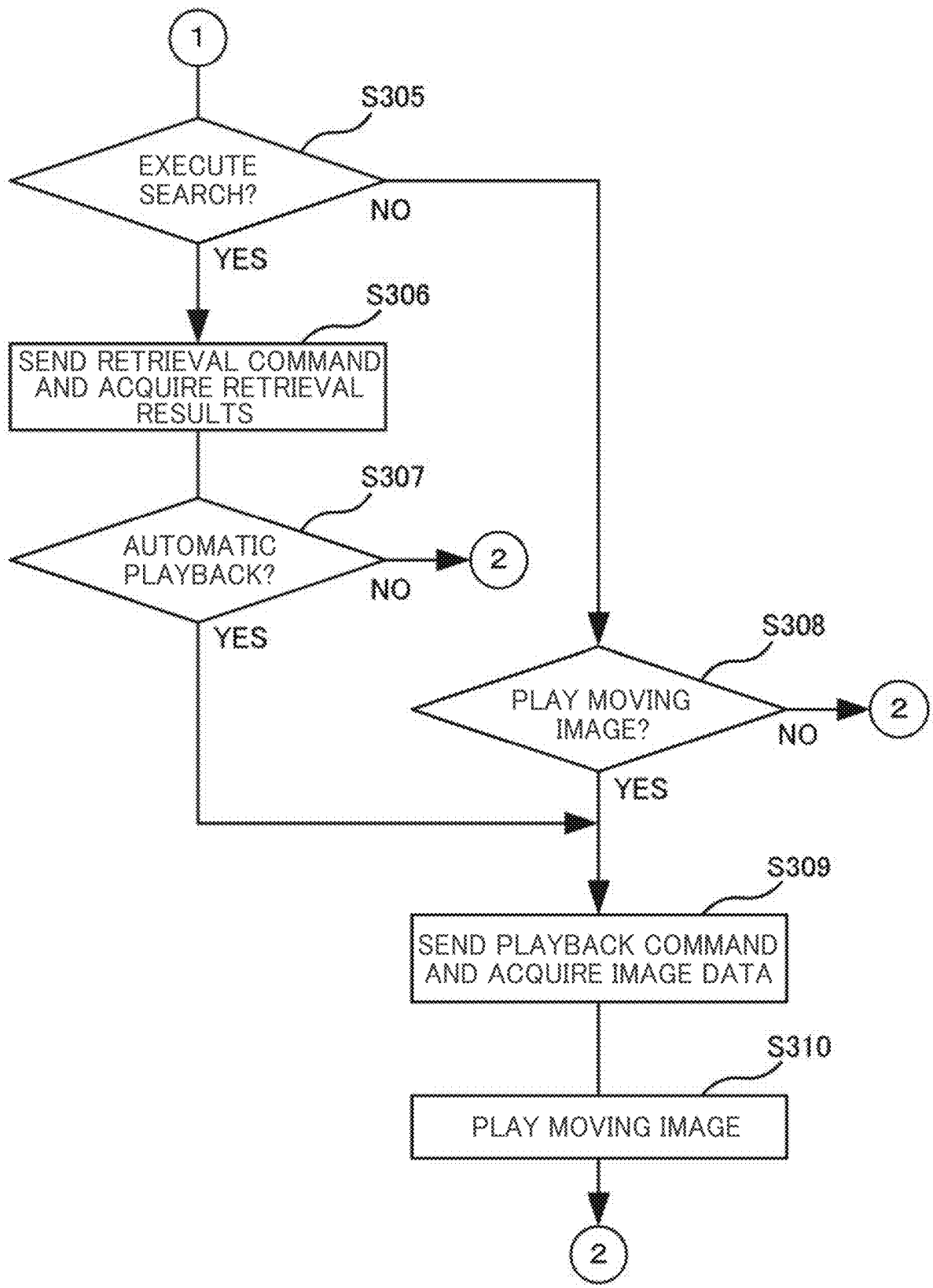
FIG. 13B is a flowchart (continued from FIG. 13A) showing the flow of the information browsing process executed in the smartphone of the embodiment.

Meanwhile, in the smartphone 40 that receives the provision of the information from the center server 30, the information browsing process of FIG. 13A and FIG. 13B is executed. This process is realized by the CPU 40A functioning as the receiving unit 400 and the control unit 410.

In step S300 of FIG. 13A, the CPU 40A of the smartphone 40 determines whether or not the app has started. The CPU 40A proceeds to step S301 in a case in which it has determined that the app has started (in the case of YES in step S300). The CPU 40A proceeds to step S302 in a case in which it has determined that the app has not started (in the case of NO in step S300).

In step S301, the CPU 40A sends a start command to the center server 30.

In step S302, the CPU 40A determines whether or not it has received a push notification. The CPU 40A proceeds to step S303 in a case in which it has determined that it has received a push notification (in the case of YES in step S302). The CPU 40A returns to step S300 in a case in which it has determined that it has not received a push notification (in the case of NO in step S302).

In step S303, the CPU 40A executes a display process. That is, the CPU 40A causes the driving information it received from the center server 30 to be displayed on the touch panel 42. Upon startup of the app, the app screen 80 including the score image SC is displayed on the touch panel 42 (see FIG. 7).

In step S304, the CPU 40A determines whether or not to end the app. The CPU 40A proceeds to step S311 in a case in which it has determined to end the app (in the case of YES in step S304). The CPU 40A proceeds to step S305 in a case in which it has determined not to end the app (in the case of NO in step S304).

In step S305 of FIG. 13B, the CPU 40A determines whether or not to execute a search. More specifically, the CPU 40A determines to execute a search in a case in which the user has operated the search buttons SB on the touch panel 42 (see FIG. 9). The CPU 40A proceeds to step S306 in a case in which it has determined to execute a search (in the case of YES in step S305). The CPU 40A proceeds to step S308 in a case in which it has determined not to execute a search (in the case of NO in step S305).

In step S306, the CPU 40A sends a retrieval command to the center server 30 and acquires the retrieval results from the center server 30.

In step S307, the CPU 40A determines whether or not to perform an automatic playback. The CPU 40A proceeds to step S309 in a case in which it has determined to perform an automatic playback (in the case of YES in step S307). In this case, in step S309, a moving image of the most recent dangerous driving incident among the retrieved dangerous driving incidents is played back. The CPU 40A returns to step S303 of FIG. 13A in a case in which it has determined not to perform an automatic playback (in the case of NO in step S307). In this case, the retrieval results are displayed in the list image LT of the touch panel 42.

In step S308, the CPU 40A determines whether or not to play back the moving image. More specifically, the CPU 40A determines to play back the moving image in a case in which the user has operated the icon IC on the map screen 84 or the text on the list image LT. The CPU 40A proceeds to step S309 in a case in which it has determined to play back the moving image (in the case of YES in step S308). The CPU 40A returns to step S303 of FIG. 13A in a case in which it has determined to not play back the moving image (in the case of NO in step S308).

In step S109, the CPU 40A sends a playback command to the center server 30 and acquires the image data from the center server 30.

In step S310, the CPU 40A plays back the moving image pertaining to the image data. Because of this, the moving image screen 86 appears on the app screen 80 of the touch panel 42, and the moving image pertaining to the dangerous driving incident is played back on the moving image screen 86 (see FIG. 8). Then, when the playback of the moving image ends, the CPU 40A returns to step S303 of FIG. 13A.

In step S311 of FIG. 13A, the CPU 40A sends an end command. Then, the information browsing process ends.

SUMMARY OF EMBODIMENT

In the center server 30 of this embodiment, the collection unit 200 causes the driving information pertaining to the dangerous driving incidents acquired from the on-board unit 20 of the vehicle 12 to be stored in the storage 30D together with the types and the danger ratings of the dangerous driving incidents. Here, the driving information of this embodiment includes driving data pertaining to the vehicle 12, such as speed and acceleration, position information, and data of moving images captured in the vehicle 12. Furthermore, the generation unit 220 generates a score for the driver of the vehicle 12 based on the driving information collected from the on-board unit 20.

Furthermore, when the user starts the app in the smartphone 40 and executes a search pertaining to the dangerous driving incidents, in the center server 30 the retrieval unit 230 retrieves the dangerous driving incidents pertaining to the driver, and the provision unit 240 provides to the user the driving information including the score for the driver and the moving images pertaining to the dangerous driving incidents. Here, the retrieval unit 230 performs the retrieval based on the types, the years and months of occurrence, and the danger ratings of the dangerous driving incidents. According to this embodiment, the user can browse information pertaining to dangerous driving incidents included in the basis of an evaluation of a certain driver by type and danger rating of the dangerous driving incidents.

Furthermore, in the center server 30 of this embodiment, in a case in which a new dangerous driving incident has occurred, the center server 30 can provide to the user, by a push notification to the smartphone 40, the driving information pertaining to the new dangerous driving incident that has occurred. That is, according to this embodiment, every time a dangerous driving incident occurs, the user can browse the information relating to the dangerous driving incident pertaining to the driver.

Furthermore, in the driving evaluation system 10 of this embodiment, in the smartphone 40, when the receiving unit 400 receives a selection of one of the dangerous driving incidents by the user, the control unit 410 causes a moving image of the dangerous driving incident pertaining to the user's selection to be displayed on the touch panel 42. Consequently, according to this embodiment, the user can browse, in his/her hands, information relating to a dangerous driving incident that the user wants to browse.

Furthermore, in the driving evaluation system 10 of this embodiment, the control unit 140 of the smartphone 40 causes the icon IC to be displayed on the map screen 84 together with the map. The icon IC is an image for indicating, in a corresponding point on the map on the map screen 84, the place of occurrence of a dangerous driving incident and displaying a moving image of that dangerous driving incident. For that reason, according to this embodiment, the user can browse the information relating to the dangerous driving incident while comparing the information with the place of occurrence of the dangerous driving incident on the map screen 84.

Moreover, in the driving evaluation system 10 of this embodiment, the control unit 410 of the smartphone 40, in a case in which it has received a selection of one of the types from a plurality of the types, causes the most recent moving image corresponding to the selected type to be displayed on the touch panel 42. For that reason, according to this embodiment, the user can browse the most recent moving image by information relating to the dangerous driving incident.

REMARKS

It will be noted that although in the above embodiment the image data included in the driving operation were data of moving images, the image data included in the driving information are not limited to moving images and may also be still images. Furthermore, text data and speech data may also be included in the driving information.

In the above embodiment, the determination unit 210 of the center server 30 determined whether or not a dangerous driving incident has occurred based on the CAN information and the image data of the external camera 26 acquired from the on-board unit 20, but the determination method is not limited to this. For example, the determination unit 210 may also determine the occurrence of a dangerous driving incident based on speech data acquired from the microphone 24. In this case, the determination unit 210 determines the occurrence of a dangerous driving incident based on squealing sounds and crash sounds. Furthermore, the determination unit 210 may also determine the occurrence of a dangerous driving incident based on image data of a moving image that the in-vehicle camera 25 has captured. In this case, the determination unit 210 calculates alertness from the facial expression of the driver captured by the in-vehicle camera 25 and determines the occurrence of a dangerous driving incident.

Furthermore, in the above embodiment, the app was executed in the smartphone 40, but the app is not limited to this and may also be executed in the on-board unit 20. This can allow the driver to check his/her own score and moving images of dangerous driving incidents while operating the monitor 27.

The app in the above embodiment can, in a case in which a family member who is the user of the app is keeping an eye on the driving habits of an elderly driver, be used for the purpose of allowing the driver himself/herself to be the user and review his/her own driving. At the same time, by providing the score and the driving information to an insurance company, insurance premiums can be optimized; by providing the score and the driving information to a local government, the timing when one is to voluntarily give up one's driver's license can be grasped; and by providing the score and the driving information to the dealer of the vehicle 12, the score and the driving information can be utilized to promote the sale of safe driving assistance systems or the like.

It will be noted that in the above embodiment, various types of processors other than CPUs may also execute the various processes that the CPUs 20A, 30A, and 40A executed by reading software (programs). Examples of processors in this case include programmable logic devices (PLDs) whose circuit configuration can be changed after manufacture, such as field-programmable gate arrays (FPGAs), and dedicated electrical circuits that are processors having a circuit configuration dedicatedly designed for executing specific processes, such as application-specific integrated circuits (ASICs). Furthermore, the receiving process described above may be executed by one of these various types of processors or may be executed by a combination of two or more processors of the same type or different types (e.g., plural FPGAs, and a combination of a CPU and an FPGA, etc.). Furthermore, the hardware structures of these various types of processors are more specifically electrical circuits in which circuit elements such as semiconductor elements are combined.

Furthermore, in the above embodiment, each of the programs was described as being stored (installed) beforehand in a computer-readable non-transitory storage medium. For example, the control program in the on-board unit 20 is stored beforehand in the ROM 20B, the processing program 100 in the center server 30 is stored beforehand in the storage 30D, and the app program 300 in the smartphone 40 is stored beforehand in the ROM 40B. However, the programs are not limited to this and may also be provided in a form in which they are stored in non-transitory storage media such as a compact disc read-only memory (CD-ROM), a digital versatile disc read-only memory (DVD-ROM), and a universal serial bus (USB) memory. Furthermore, the programs may also take a form in which they are downloaded via a network from an external device.

The processes in the above embodiment may also be executed not just by one processor but by plural processors working together. The process flows described in the above embodiment are also examples, and unnecessary steps may be omitted, new steps may be added, and process orders may also be changed in a range that does not depart from the spirit of the disclosure.

What is claimed is:

1. A driving evaluation device comprising:
   a first memory; and
   a first processor that is coupled to the first memory, wherein the first processor is configured to:
   determine types of dangerous driving incidents of a respective driver and danger rating levels of the dangerous driving incidents of the respective driver, the types of dangerous driving incidents comprising at least one of speeding, obstructing pedestrians, running red lights, and failing to stop at stop signs,
   cause driving information, including driving data pertaining to a vehicle, of the respective driver pertaining to the dangerous driving incidents of the respective driver collected from the vehicle to be stored in a storage unit in relation to the types of the dangerous driving incidents, including a vehicle performance relative to a pedestrian, and the danger rating levels of the dangerous driving incidents of the respective driver,
   generate evaluation information of the respective driver of the vehicle based on the driving information collected from the vehicle, the evaluation information comprising a score based on standard scores, with respect to parameters related to the dangerous driving incidents for other drivers collected from the vehicle,
   retrieve the dangerous driving incidents of the respective driver based on at least one of the types of the dangerous driving incidents or the danger rating levels, and
   provide, to a user, the evaluation information of the respective driver that has been generated and the driving information of the respective driver related to the dangerous driving incidents that have been retrieved.

2. The driving evaluation device of claim 1, wherein the first processor is configured, in a case in which a new dangerous driving incident has occurred, to provide new driving information pertaining to the new dangerous driving incident that has occurred.

3. A driving evaluation system comprising:
   the driving evaluation device of claim 1; and
   a terminal carried by the user and including a second memory and a second processor that is coupled to the second memory,
   wherein the second processor is configured to:
   receive a selection of one of the dangerous driving incidents by the user from a plurality of the dangerous driving incidents that have been retrieved by the first processor, and
   cause an image of driving information relating to the dangerous driving incident pertaining to the user's selection that the second processor has received to be displayed so as to be viewable by the user.

4. The driving evaluation system of claim 3, wherein:
   the driving information that is stored includes places of occurrence of the dangerous driving incidents, and
   the second processor is configured to cause an icon for indicating, at corresponding points on a map, the places of occurrence of the dangerous driving incidents and displaying images of the driving information corresponding to the dangerous driving incidents to be displayed together with the map.

5. The driving evaluation system of claim 3, wherein:
   the driving information that is stored includes dates and times of occurrence of the dangerous driving incidents, and
   the second processor is configured, in a case in which the second processor has received a selection of one of the types from a plurality of the types, to cause an image of most recent driving information corresponding to the selected type to be displayed.

6. A driving evaluation method performed by a processor, comprising:
   determining types of dangerous driving incidents of a respective driver and danger rating levels of the dangerous driving incidents of the respective driver, the types of dangerous driving incidents comprising at least one of speeding, obstructing pedestrians, running red lights, and failing to stop at stop signs, causing driving information, including driving data pertaining to a vehicle, of the respective driver pertaining to the dangerous driving incidents of the respective driver collected from the vehicle to be stored in a storage unit in relation to the types of the dangerous driving incidents, including a vehicle performance relative to a pedestrian, and the danger rating levels of the dangerous driving incidents of the respective driver, generating evaluation information of the respective driver of the vehicle based on the driving information collected from the vehicle, the evaluation information comprising a score based on standard scores, with respect to parameters related to the dangerous driving incidents for other drivers collected from the vehicle, retrieving the dangerous driving incidents of the respective driver based on at least one of the types of the dangerous driving incidents or the danger rating levels, and providing, to a user, the evaluation information of the respective driver that has been generated and the driving information of the respective driver related to the dangerous driving incidents that have been retrieved.

7. The driving evaluation method of claim 6, further comprising:

in a case in which a new dangerous driving incident has occurred, providing new driving information pertaining to the new dangerous driving incident that has occurred.

8. The driving evaluation method of claim 6, further comprising:

receiving a selection of one of the dangerous driving incidents by the user from a plurality of the dangerous driving incidents that have been retrieved by the processor, and causing an image of driving information relating to the dangerous driving incident pertaining to the user's selection that has been received to be displayed so as to be viewable by the user.

9. The driving evaluation method of claim 8, wherein:

the driving information that is stored includes places of occurrence of the dangerous driving incidents, and the driving evaluation method further comprises:

by a second processor, causing an icon for indicating, at corresponding points on a map, the places of occurrence of the dangerous driving incidents and displaying images of the driving information corresponding to the dangerous driving incidents to be displayed together with the map.

10. The driving evaluation method of claim 8, wherein:

the driving information that is stored includes dates and times of occurrence of the dangerous driving incidents, and the driving evaluation method further comprises:

in a case in which a selection of one of the types from a plurality of the types has been received, by a second processor, causing an image of most recent driving information corresponding to the selected type to be displayed.

11. A non-transitory storage medium storing a program executable by a first processor to perform a driving evaluation process comprising:

determining types of dangerous driving incidents of a respective driver and danger rating levels of the dangerous driving incidents of the respective driver, the types of dangerous driving incidents comprising at least one of speeding, obstructing pedestrians, running red lights, and failing to stop at stop signs, causing driving information, including driving data pertaining to a vehicle, of the respective driver pertaining to the dangerous driving incidents of the respective driver collected from the vehicle to be stored in a storage unit in relation to the types of the dangerous driving incidents, including a vehicle performance relative to a pedestrian, and the danger rating levels of the dangerous driving incidents of the respective driver, generating evaluation information of the respective driver of the vehicle based on the driving information collected from the vehicle, the evaluation information comprising a score based on standard scores, with respect to parameters related to the dangerous driving incidents for other drivers collected from the vehicle, retrieving the dangerous driving incidents of the respective driver based on at least one of the types or the danger rating levels, and providing, to a user, the evaluation information of the respective driver that has been generated and the driving information of the respective driver related to the dangerous driving incidents that have been retrieved.

12. The non-transitory storage medium of claim 11, wherein the driving evaluation process further comprises:

in a case in which a new dangerous driving incident has occurred, providing new driving information pertaining to the new dangerous driving incident that has occurred.

13. The non-transitory storage medium of claim 11, wherein the driving evaluation process further comprises:

receiving a selection of one of the dangerous driving incidents by the user from a plurality of the dangerous driving incidents that have been retrieved by the first processor, and causing an image of driving information relating to the dangerous driving incident pertaining to the user's selection that has been received to be displayed so as to be viewable by the user.

14. The non-transitory storage medium of claim 13, wherein:

the driving information that is stored includes places of occurrence of the dangerous driving incidents, and wherein the driving evaluation process further comprises:

by a second processor, causing an icon for indicating, at corresponding points on a map, the places of occurrence of the dangerous driving incidents and displaying images of the driving information corresponding to the dangerous driving incidents to be displayed together with the map.

15. The non-transitory storage medium of claim 13, wherein:

the driving information that is stored includes dates and times of occurrence of the dangerous driving incidents, and wherein the driving evaluation process further comprises:

in a case in which a selection of one of the types from a plurality of the types has been received, by a second processor, causing an image of most recent driving information corresponding to the selected type to be displayed.

* * * * *